United States Patent [19]

Cantrell et al.

[11] Patent Number: 4,987,864
[45] Date of Patent: Jan. 29, 1991

[54] TWO CYCLE ENGINE WITH VALVED PRESSURE SCAVENGING

[75] Inventors: Ronald J. Cantrell, Belleville; Edward D. Klomp, Mount Clemens; Edward G. Groff, Troy; James G. Solomon, Grosse Pointe Woods; Michael J. Gorman, Royal Oak, all of Mich.

[73] Assignee: General Motors Corporation, Detroit, Mich.

[21] Appl. No.: 369,220

[22] Filed: Jun. 21, 1989

[51] Int. Cl.⁵ ............................................. F02B 75/02
[52] U.S. Cl. ........................... 123/65 BA; 123/190 A; 123/559.1
[58] Field of Search ............ 123/65 BA, 190 A, 559.1, 123/47 R, 73 PP, 65 R, 65 V, 73 A, 73 B, 73 C, 73 S

[56] References Cited

U.S. PATENT DOCUMENTS

| 2,110,754 | 3/1938 | Alston | 123/65 BA |
| 2,113,979 | 4/1938 | Bokemuller | 123/65 BA |
| 2,115,525 | 4/1938 | Hocke et al. | 123/65 BA |
| 2,924,069 | 2/1960 | Buchi | 123/65 BA |
| 2,949,905 | 8/1960 | Brueder | 123/65 BA |
| 3,680,305 | 8/1972 | Miller | 123/65 BA |
| 4,340,016 | 7/1982 | Ehrlich | 123/73 PP |
| 4,579,093 | 4/1986 | Eanes | 123/65 BA |
| 4,864,979 | 9/1989 | Eickmann | 123/65 BA |

FOREIGN PATENT DOCUMENTS

| 83/01985 | 6/1983 | PCT Int'l Appl. | 123/65 BA |
| 1241191 | 7/1971 | United Kingdom | 123/73 V |

Primary Examiner—David A. Okonsky
Attorney, Agent, or Firm—Robert J. Outland

[57] ABSTRACT

A port scavenged two cycle engine with a separate source of pressurized air has a valve between each port and the air supply to provide a high blowdown pulsing scavenging flow to the cylinders similar to that of a crankcase scavenged engine. Various arrangements with additional features are disclosed.

9 Claims, 5 Drawing Sheets

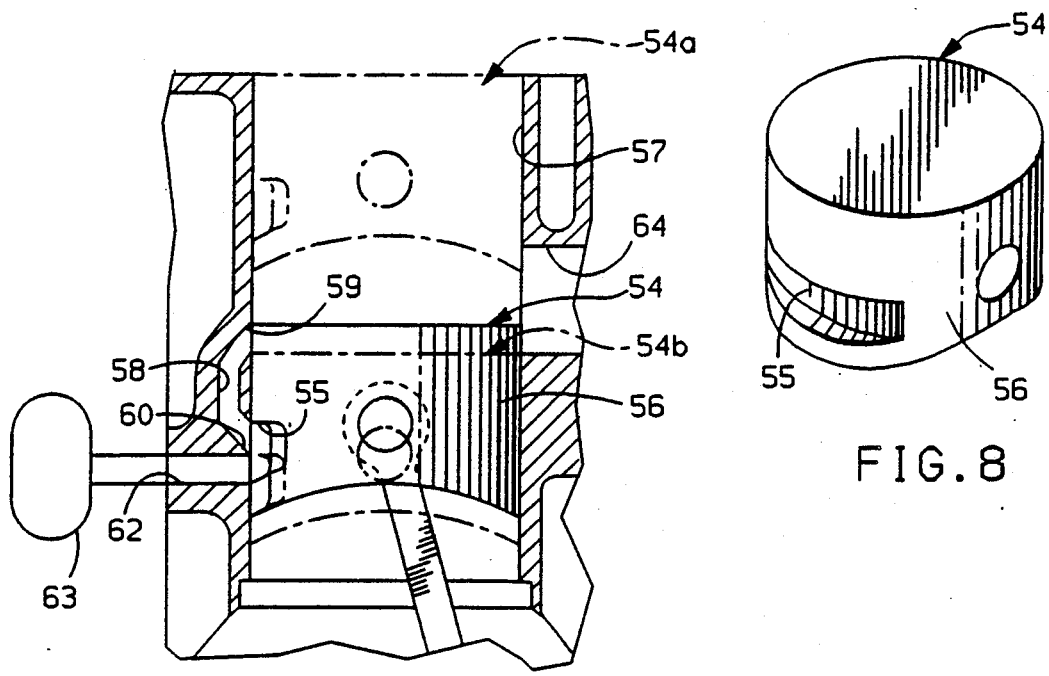
FIG.7
FIG.8
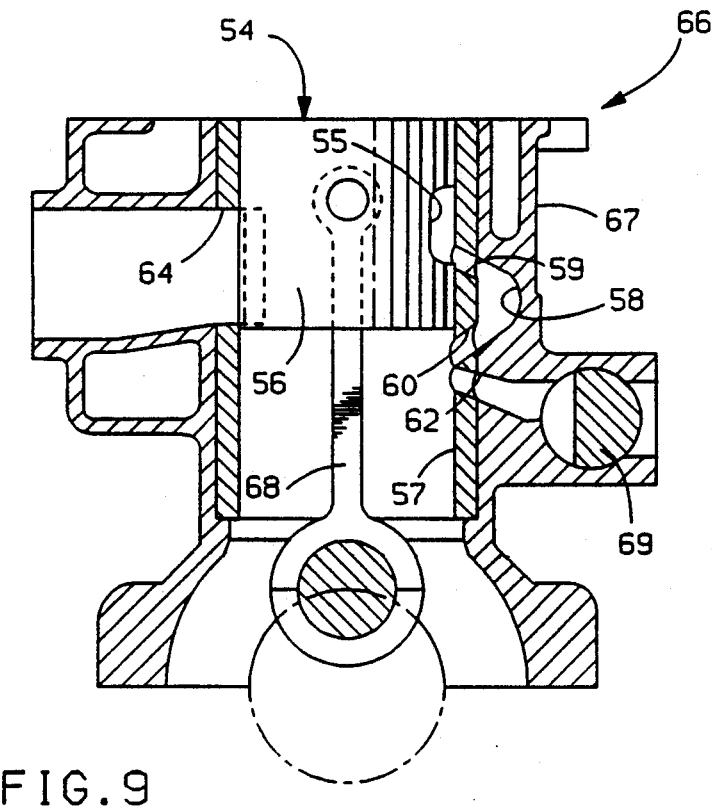
FIG.9

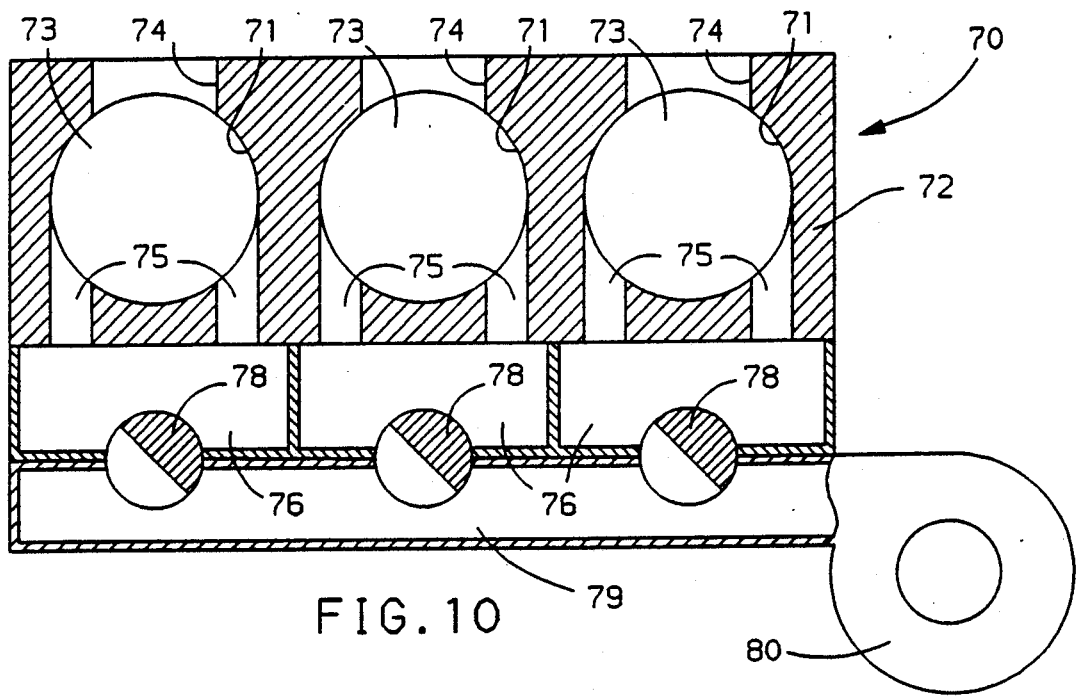
FIG. 10
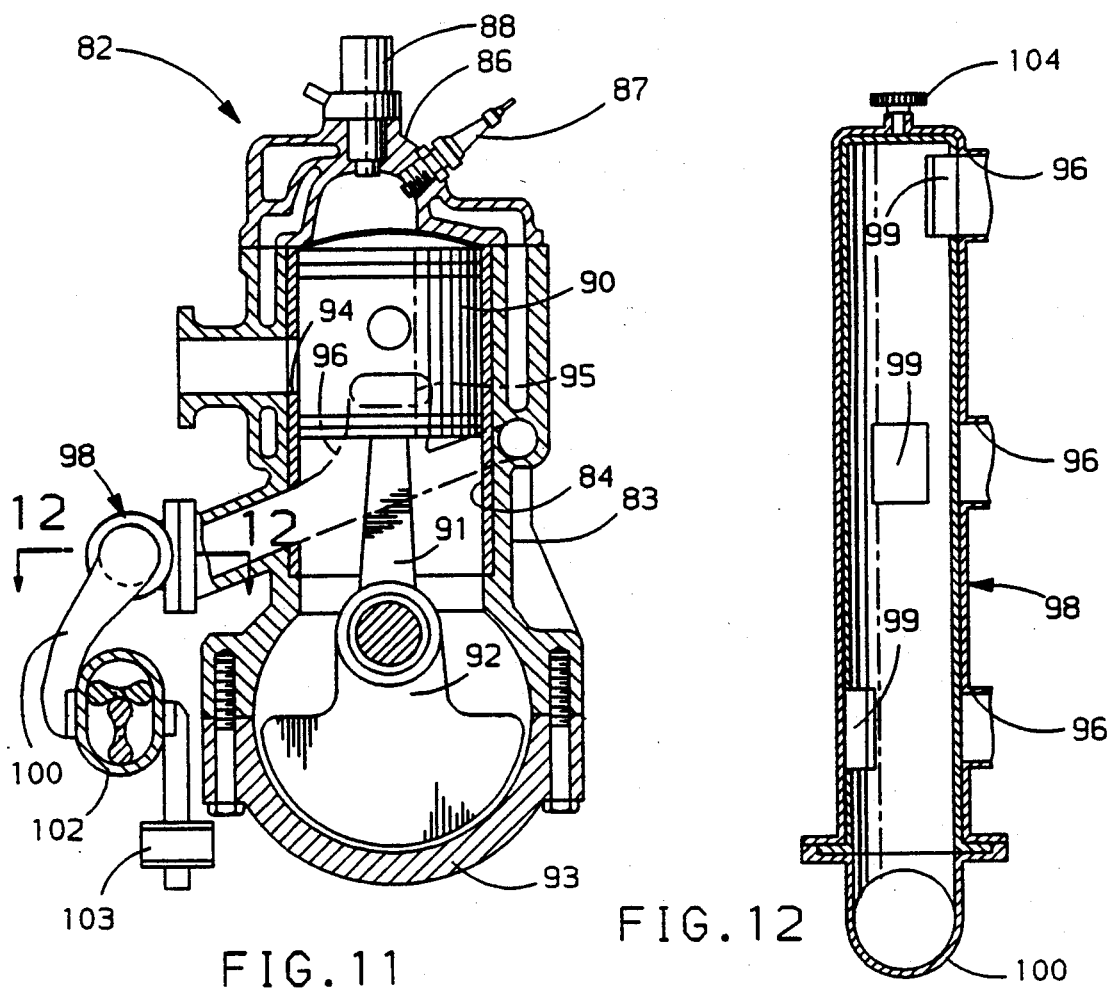
FIG. 11
FIG. 12

TWO CYCLE ENGINE WITH VALVED PRESSURE SCAVENGING

TECHNICAL FIELD

This invention relates to two cycle engines with valved pressure scavenging.

BACKGROUND

Pulsed scavenging of two cycle engines as obtained by crankcase scavenging has recognized advantages but requires special lubrication systems not favored for automotive use. Blower scavenging while well developed in two cycle diesel engines does not provide the pulsed flow of crankcase scavenging.

One of the features of most crankcase-scavenged two-stroke-cycle engines is a dry-sump design. This prohibits the use of inexpensive, tough journal-type bearings and, for multi-cylinder configurations, entails the further complication of splitting the crankshaft or the roller-type bearings located between cylinders. Split roller bearings are also needed for all of the connecting rods at the crankshaft. If crankcase compression is replaced by a blower, a conventional wet-sump crankcase with journal bearings becomes practicable.

External blowers, such as the roots type, are widely used to provide scavenge air for diesel engines. Examples are the uniflow Detroit and Electro-Motive diesel engines. Diesel engines are generally unthrottled and the goal is to achieve optimum scavenging effectiveness. Pumping systems for diesel engines generally provide a fairly constant delivery pressure to the engine cylinders throughout the scavenge period. This reduces the pumping work required compared to a crankcase scavenged engine.

In contrast to the uniform pressure in a blown engine, the pressure in a crankcase-scavenged engine varies significantly during the delivery period. This produces a strong pulse of flow into the combustion chamber as the intake ports are being uncovered. At lower speeds, this initial pulse may be driven by a pressure of about one-half atmosphere in excess of ambient pressure and be dissipated before the piston has uncovered half of the intake port area. This pulse has a strong influence on the scavenge flow development inside the combustion chamber. It can strongly influence the gradient of fresh charge concentration within the cylinder. At part-load operation the fresh charge may only represent one-third or less of the cylinder contents, the rest being residual products, so the gradient of fresh charge relative to the location of the fuel injector during the injection period and relative to the spark plug location at the time of spark discharge can be critical to the combustion process. Experimental results showed that much inferior performance was achieved from an engine converted from crankcase-compression operation to a uniform pressure delivery system. Studies for variable and constant pressure air delivery systems found very significant alterations of the gradients of fresh charge concentration between the variable and constant pressure systems.

SUMMARY OF THE INVENTION

Since the crankcase-compression configuration appears to provide part-load operational advantages and the external blower constructional advantages, there is an incentive to try to make the blower system perform operationally the same as a crankcase system at part load. The present invention provides various engine arrangements which use blower pressure scavenging with valves and other means for providing pulsed flow to simulate crankcase scavenging while allowing the use of conventional automotive engine lubrication systems.

These and other features and advantages of the invention will be more fully understood from the following description of certain specific embodiments of the invention taken together with the accompanying drawings.

BRIEF DRAWING DESCRIPTION

In the drawings:

FIG. 7 is a side view of a piston valve arrangement for obtaining pulsed scavenging and charging flow;

FIG. 8 is a pictorial view of the piston of FIG. 7;

FIG. 9 is a cross-sectional view of a combined piston and rotary view valve arrangement for obtaining pulsed scavenging and charging flow;

FIG. 10 is a schematic view of a blower scavenged engine with a throttled air box arrangement for obtaining pulsed scavenging flow;

FIG. 11 is a partially schematic cross-sectional view of a blower scavenged engine with a rotary cutoff valve chamber arrangement for obtaining pulsed scavenging flow; and FIG. 12 is a cross-sectional view of the cutoff valve from the plane of the line 12—12 of FIG. 11.

DETAILED DESCRIPTION

Figure 1:
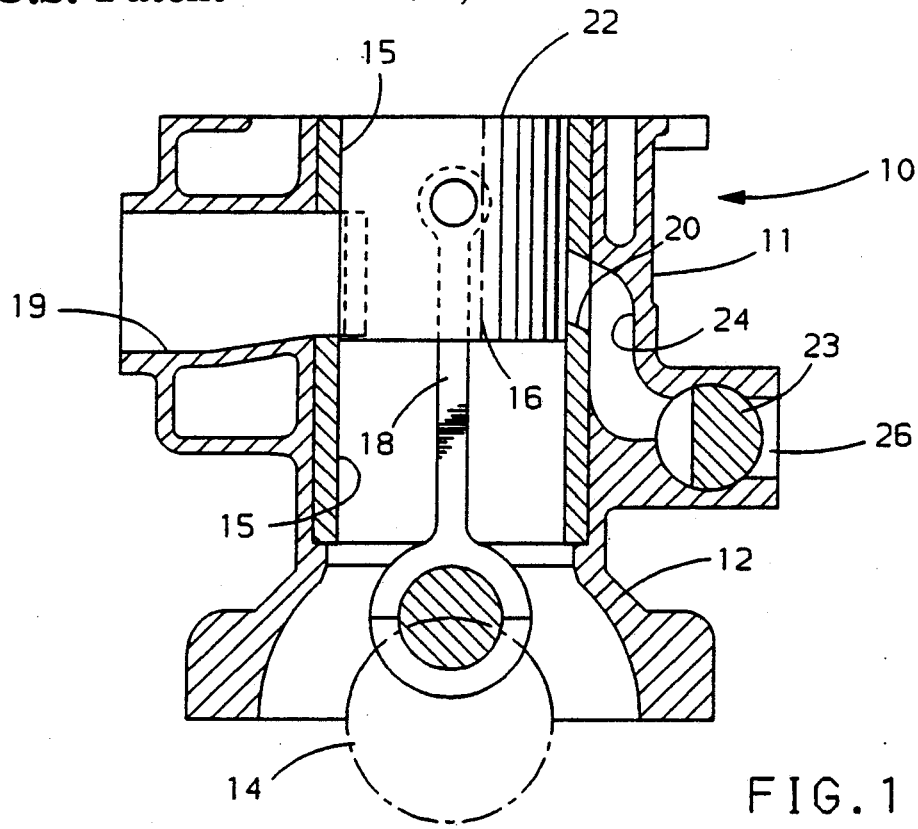
FIGS. 1-4 are cross-sectional views of an engine in different operational phases of a rotary valved inlet port arrangement for obtaining pulsed scavenging and charging flow.

Referring now to the drawings in detail, FIGS. 1-9 show engine arrangements scavenged by a pressure blower or supercharger and having various valve means timed with engine piston motion to provide an initial scavenging flow pulse upon opening of the associated inlet port by the piston and an optional second pressure charging pulse just before closing of the inlet port to provide a fresh air charge and, optionally, obtain a degree of cylinder supercharge.

FIGS. 1-4 show an engine 10 having a cast cylinder block 11 including an upper crankcase 12 supporting a crankshaft, not shown but indicated by a crank circled 14. The block 11 defines a plurality of aligned cylinders 15, only one of which is shone. A piston 16 in each cylinder is connected by a connecting rod 18 to a respective throw of the crankshaft for reciprocating motion of the piston in the cylinder.

Each cylinder has between its ends at least one exhaust port 19 and one inlet port 20 which are closed and opened by the piston motion, the exhaust port generally extending somewhat closer to the outer end 22 of the cylinder than the inlet port. The inlet ports are also controlled by a rotary valve 23 (at least one for each cylinder) disposed in an inlet passage 24 and timed to obtain the desired results. A low to moderate pressure air supply from a blower or supercharger system, not shown, is provided to the inlet side 26 of the rotary valve 23.

Various portions of the operating cycle are illustrated in the figures. In FIG. 1, the piston 16 is at top dead center closing the inlet 20 and exhaust 19 ports. The rotary valve 23 is also closed. At about 90 degrees after top center, the piston begins to open the exhaust port 19 to allow blowdown of burned gases to the exhaust.

Figure 2:
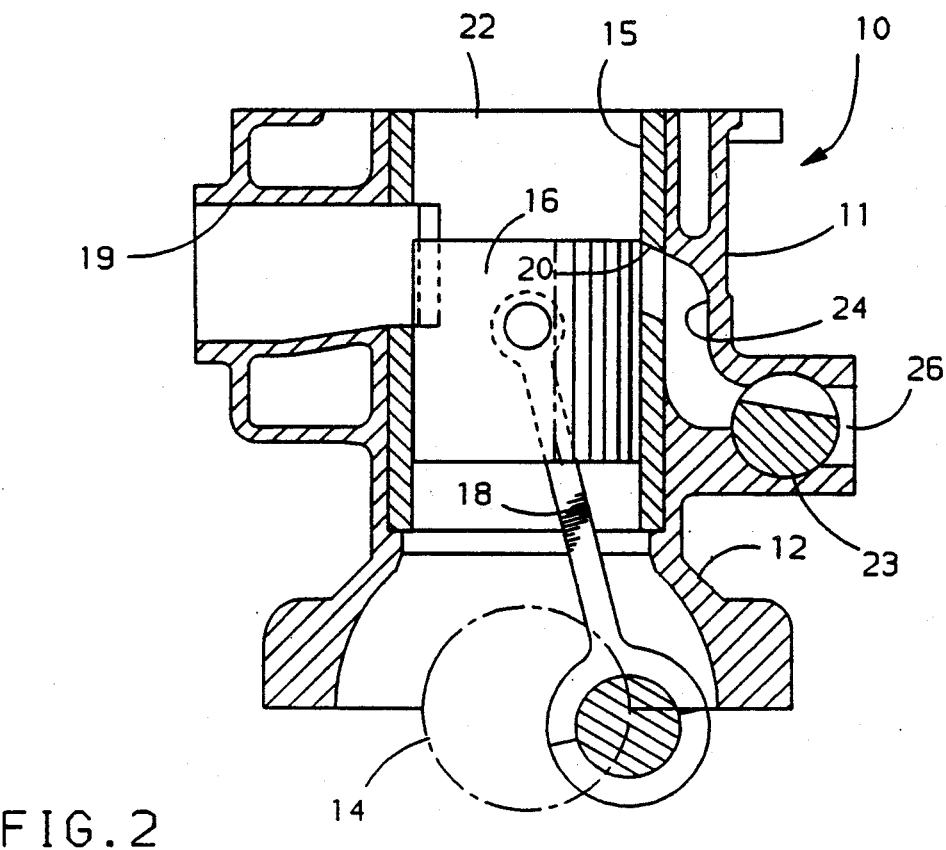
Figure 3:
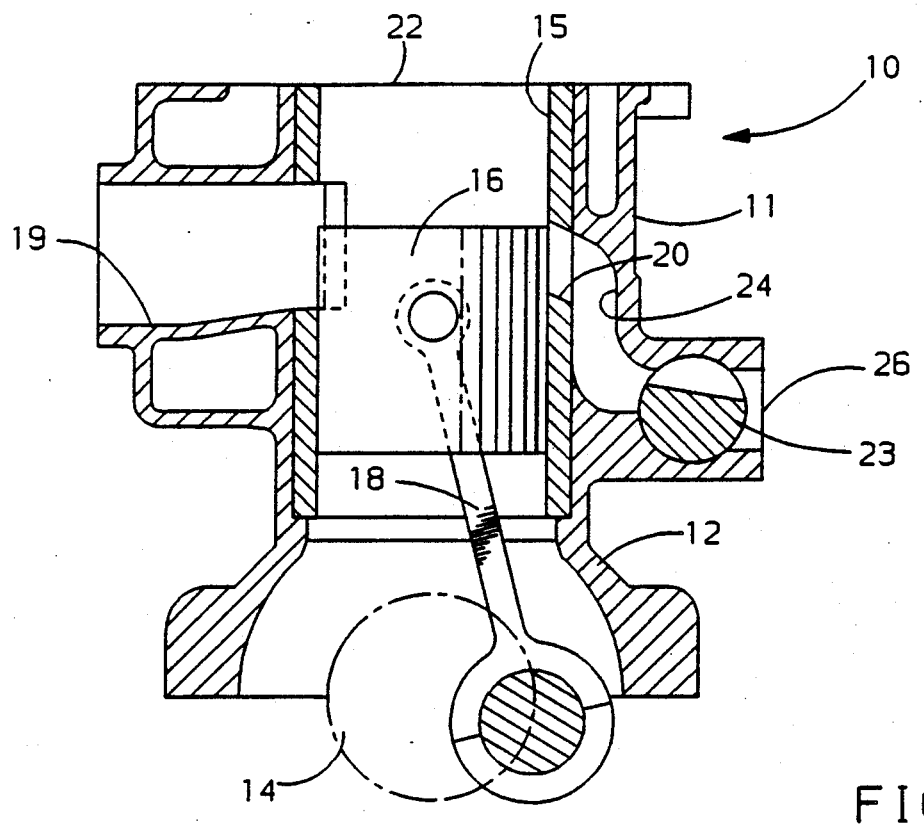
Figure 4:
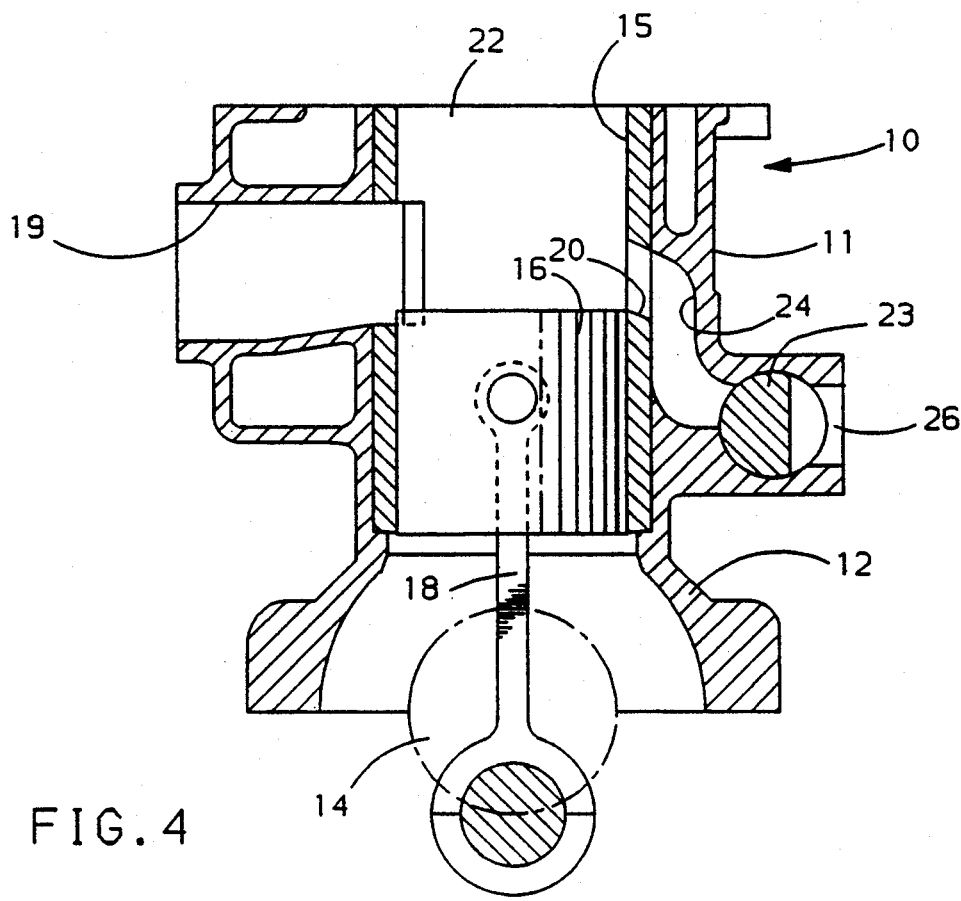

At about 100 degrees after top center, FIG. 2, the rotary valve 23 is open and the piston 16 is beginning to open the inlet port 20. From this point until about 114 degrees after top center when the rotary valve 23 closes, FIG. 3, a pulse of pressurized scavenging air is forced through the passage 24 into the cylinder to initiate scavenging of the cylinder of exhaust products. Scavenging continues through expansion of the scavenging air as the piston 16 reaches bottom dead center, FIG. 4, and begins to move upward toward port closing.

The rotary valve 23 is arranged to open the inlet passage 24 during a short period before the piston 16 closes the inlet port 20 to allow a second pulse of air to enter the cylinder and provide a fresh charge and, possibly, a degree of supercharge. Timing of the exhaust port will affect the supercharge potential. However, this second pulse may be omitted by suitable configuration of the rotary valve so that the scavenging flow will more closely approximate the effect obtained in a crankcase scavenged engine.

Figure 5:
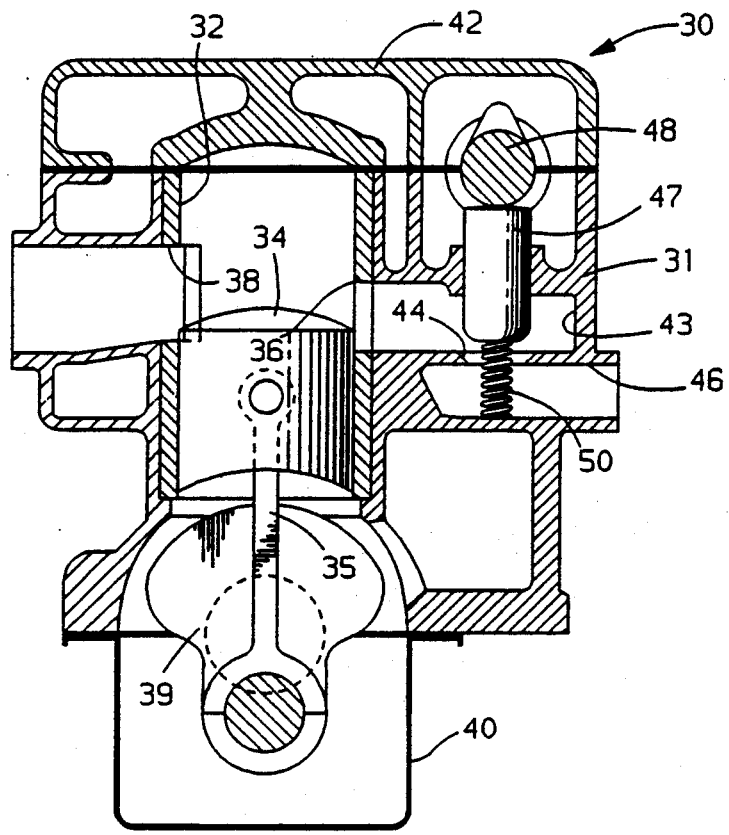
FIGS. 5 and 6 are cross-sectional views of engines with differing poppet valve arrangements for pulsed scavenging and charging flow.
Figure 6:
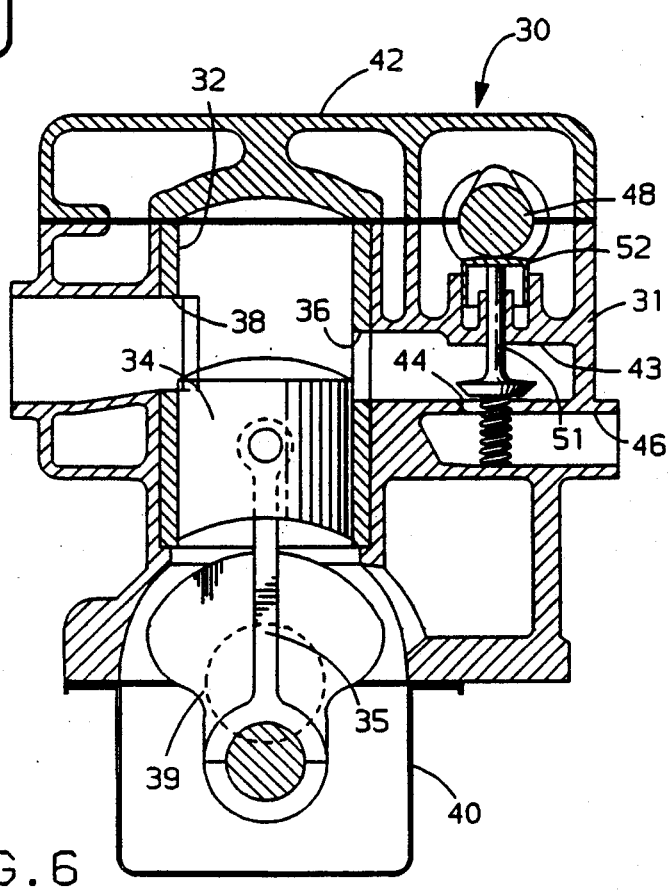

FIGS. 5 and 6 show poppet valve arrangements for purposes similar to those just described. An engine 30 has a block 31, cylinder 32, piston 34 and connecting rod 35 functionally similar to those of FIGS. 1-4. The cylinder has an inlet port 36 and an exhaust port 38. The crankshaft 39, oil pan 40 and a cylinder head 42 are also shown. An inlet passage 43 includes a valve seat 44 with an upstream inlet 46 for connection with a supercharger or other pressurized air source.

In FIG. 5, a bullet-shaped poppet valve 47 is forced by a camshaft 48 against a spring 50 to cyclically engage the seat 44 and close the inlet passage 43. In FIG. 6, the valve 51 is mushroom shaped with a tappet 52 that is engaged by the camshaft 48 to close the passage 43. In both cases, the valve timing is such as to cut off the scavenging flow after an initial surge or pulse in order to simulate crankcase scavenging. If desired, the valves could be timed to also open and supply a second pulse of air shortly before closing of the inlet port 36 by the piston 34.

FIGS. 7 and 8 show a piston valve for accomplishing pulse charging. FIG. 8 illustrates the piston 54 having a so-called puff port relief 55 in one side of the skirt 56. FIG. 7 schematically illustrates the piston action in an enginge cylinder 57 having a puff port 58 with upper and lower cylinder openings 59, 60, respectively. An inlet passage 62 just below the opening 60 connects the cylinder 57 to a pressure air source which may have the form of a blower or supercharger 63. An exhaust port 64 is conventionally located in the cylinder 57. The top dead center position of the piston is indicated by dashed lines 54a and the bottom dead center position by dashed lines 54b while solid lines 54 indicate an operative intermediate position about 100 degrees after top center.

In operation, when the piston 54 is in the solid line position shown, the piston relief 55 connects with both the inlet passage 62 and the lower puff port opening 60, while the upper opening 59 is just beginning to be uncovered by the piston on its downstroke. A pulse of scavenging air is thus released into the cylinder during downward motion of the piston from about 100-114 degrees after top center (or any other desired period) after which the piston covers the lower opening 60 to cut off further flow near its bottom center position 54b.

If additional controls are not added, a second pulse of scavenging or charging air is released on the piston upstroke when the piston relief 55 again connects with the passage 62 and puff port 58 and the upper opening 59 is not yet closed by the piston.

FIG. 9 shows an application of the arrangement of FIG. 7 in an engine 66 with a block 67 and connecting rods 68 and wherein like numerals identify the other like parts. This embodiment adds to the features of FIG. 7 a rotary valve 69 to additionally block loss of air to the crankcase when the piston is at or near the top center position shown. The valve 69 is located and timed to block air flow into the crankcase through the inlet passage 62 during periods when the piston skirt 56 is above passage but to open and allow action of the piston relief 55 and port 58 to transmit pulsed flow from the passage 62 to the cylinder as described in relation to FIG. 7.

FIGS. 10-12 pertain to arrangements wherein an air box or scavenge chamber is provided for each cylinder and the scavenging charges are controlled at the inlet to stimulate crankcase scavenging.

FIG. 10 schematically illustrates an engine 70 having three cylinders 71 in a block 72 with a piston 73 in each cylinder controlling an exhaust port 74 and a pair of intake ports 75. The intake ports 75 connect with air boxes 76, one for each cylinder. These are connected via individual throttle valves 78 with an inlet manifold 79 or plenum connected with the outlet of a scavenging blower 80.

In operation, the blower 80 supplies air to the inlet manifold 79 and, through the throttle valves 78, to the air boxes 76 from which it is admitted to the cylinders 71 when their respective pistons, 73 open their respective intake ports 75. At part load, closing the throttles 78 increases the discharge pressure from the blower 80, assuming that the blower operates at constant speed. However, since the scavenging process in each cylinder only occurs during about ⅓ of a revolution and, to approximate a crankcase-scavenged engine, the air box blowdown can require only about 1/20 of a revolution, there is much more time available for air box filling than for emptying. Consequently, when the intake ports 75 are closed by the engine piston 73, air box 76 pressure begins to increase and approach the discharge pressure of the blower 80. When the intake ports 75 are uncovered by the piston 73, because the intake port area become much larger than the throttled inlet to the air box 76 shortly after the ports 75 are uncovered, a rapid air-box blowdown will occur, providing an instantaneous scavenge flow rate similar to that of a crankcase-scavenged engine.

FIGS. 11 and 12 show another embodiment of two cycle engine 82 having a block 83 with three aligned cylinders 84, only one being shown. The cylinders are closed at their upper ends by means such as a cylinder head 86 mounting a spark plug 87 and a fuel injector 88 for each cylinder.

A piston 90 in each cylinder is connected by a connecting rod 91 to a crankshaft 92 carried in the lower crankcase portion of the block 83. The crankshaft main and crankpin bearings and the piston pin bearings, not shown, are preferably plain bearings that are pressure lubricated in any suitable manner conventional for four cycle engines and made possible by the scavenging arrangement of this embodiment. A conventional wet sump system with oil contained in the oil pan 93 may therefore be used.

The cylinders 84 each have an exhaust port 94 and a plurality of intake ports 95 for each cylinder which are controlled by the reciprocating pistons 90. The intake ports 95 are connected by ducts 96 with longitudinally spaced portions of a rotary valve 98 having windows 99 that connect the ducts 96 of the respective cylinders with the hollow interior of the valve 98. The ducts preferably provide, or are connected with, a sufficient volume to provide an accumulator chamber for each cylinder connected with its inlike ports 95.

The valve interior connects through a conduit 100 with a scavenging blower 102 which may be of the roots type. A conventional intake filter 103 is provided on the inlet side of the blower 102.

In operation, this embodiment provides a two cycle engine concept that has the benefits of both the crankcase and blower scavenged engine. The blower 103 develops pressurized scavenging charges in the accumulator chamber ducts 96 in order to simulate a crankcase scavenged engine. The accumulator chambers 96 are defined by the rotary valve 98 (when the valve has closed off such chamber) and the respective piston when it is at top-dead-center. The volume between can be within the block casting itself or in an additional volume, which may have to be attached to the block. The blower need not be of the roots type shown in FIG. 1.

The blower 102 pushes the charge axially into the center of the rotary valve 98 where it is distributed to the proper accumulator chamber ducts 96 by the timed port windows 99 in the rotary valve. The size shape and timing of these windows, size of the accumulator chambers 96 and the blower displacement rate would be such that the quantity and pressure of the charge in the accumulator chamber would simulate the charge from a crankcase scavenged engine as the piston 90 uncovers the intake ports 95. The rotary valve is turned at engine crank speed via a gear 104 or a belt. The rotary valve isolates the induction accumulator (charging) chamber (ducts 96) of each cylinder from the others.

Among the advantages stemming from this engine embodiment is that the blower scavenging virtually eliminates engine lubricant from the scavenging charge, hence reducing the potential for lubricant emissions. The concept allows present transfer and boost port geometry to be utilized. This concept also allows use of a conventional (for a four stroke engine) oil sump and pressurized lubrication of the bearings on the crank and at either end of the connecting rod, eliminating the need for the roller bearings which can be replaced by plain journal bearings. This conventional lubrication also eliminates the need for special two cycle oil.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A two cycle engine having multiple cylinders, each with an inlet port and a reciprocable piston operative to open and close the inlet port, pressurized air supply means connected via separate passages with the inlet ports of the cylinders for delivering pressurized scavenging and charging air to the cylinders, and a valve in each of the passages and spaced from their respective inlet ports to additionally control the supply of pressurized air to the passage portions adjacent the respective inlet ports, wherein
  each said valve is timed to be open during an initial scavenging interval after port opening and a final charging interval before port closing by the piston and said valve is timed to be closed during the intermediate period in which the port is open to limit the supply of pressurized air to the initial scavenging and final charging intervals.

2. A two cycle engine as in claim 1 wherein said valve is a rotary member operated in timed relation to the engine speed.

3. A two cycle engine as in claim 1 wherein said valve is a reciprocating member operated in timed relation to the engine speed.

4. A two cycle engine as in claim 1 wherein said valve is in part formed by portions of the piston and cylinder coacting at a location spaced from said port.

5. A two cycle engine as in claim 4 and further including an additional timed valve in each passage and operative to prevent loss of pressurized air into the engine crankcase during a further portion of each cylinder cycle.

6. A two-cycle engine having multiple cylinders, each with an inlet port and a reciprocable piston operative to open and close the inlet port, pressurized air supply means connected via separate passages with the inlet ports of the cylinders for delivering pressurized scavenging and charging air to the cylinders, and a valve in each of the passages and spaced from their respective inlet ports to additionally control the supply of pressurized air to the passage portions adjacent the respective inlet ports, and further comprising
  a separate air chamber for each cylinder between said valves and their associated inlet ports, each said valve being operative to admit charges of pressurized air to its respective air chamber during periods when the respective inlet port is closed, said changes to be discharged into the associated cylinder in a pulsing flow after each opening of the respective inlet ports.

7. A two cycle engine as in claim 6 wherein each said valve is a throttle providing a substantially smaller flow area than its associated inlet ports to limit the flow into its air chamber to a rate lower than the discharge rate and thereby provide a pulsing flow of scavenging air to the cylinder which is significantly reduced after an initial blowdown.

8. A two cycle engine as in claim 7 wherein each said valve operates as a timed shutoff which limits pressurized air flow into its respective air chamber to periods when the associated inlet ports are closed to thereby provide a pulsing flow of scavenging air to the associated cylinder which is significantly reduced after an initial blowdown.

9. A two cycle engine as in claim 8 wherein said valve is a rotary member.

* * * * *